United States Patent
Dey et al.

(10) Patent No.: US 6,493,707 B1
(45) Date of Patent: *Dec. 10, 2002

(54) HYPERVIDEO: INFORMATION RETRIEVAL USING REALTIME BUFFERS

(75) Inventors: Jayanta Kumar Dey, Cambridge, MA (US); Haiping Xu, Acton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,293

(22) Filed: Oct. 29, 1999

(51) Int. Cl.$^7$ .............................. G06F 1/00; G06F 17/30
(52) U.S. Cl. ................ 707/3; 707/6; 707/501; 707/501.1
(58) Field of Search .................. 707/3, 6, 501, 707/501.1, 434, 320; 345/719

(56) References Cited

U.S. PATENT DOCUMENTS

| | | | |
|---|---|---|---|
| 5,504,675 A | 4/1996 | Cragun et al. | 364/401 |
| 5,515,098 A | 5/1996 | Carles | 348/8 |
| 5,636,346 A | 6/1997 | Saxe | 395/201 |
| 5,640,193 A | 6/1997 | Wellner | 348/7 |
| 5,708,845 A * | 1/1998 | Wistendahl et al. | |
| 5,826,267 A | 10/1998 | McMillan | 707/9 |
| 5,920,859 A | 7/1999 | Li | 707/5 |
| 5,933,822 A | 8/1999 | Braden-Harder et al. | 707/5 |
| 5,933,832 A | 8/1999 | Suzuoka et al. | 707/101 |
| 5,937,422 A | 8/1999 | Nelson et al. | 707/531 |
| 5,941,944 A | 8/1999 | Messerly | 709/203 |
| 5,987,457 A | 11/1999 | Ballard | 707/5 |
| 5,991,735 A | 11/1999 | Gerace | 705/10 |
| 6,029,167 A | 2/2000 | Evans | 707/4 |
| 6,070,157 A | 5/2000 | Jacobson et al. | 707/1 |
| 6,070,158 A | 5/2000 | Kirsch et al. | 707/3 |
| 6,141,001 A | 10/2000 | Balch | 345/302 |
| 6,145,000 A | 11/2000 | Stuckman et al. | 709/219 |
| 6,154,737 A | 11/2000 | Inaba et al. | 707/3 |
| 6,199,076 B1 * | 3/2001 | Logan et al. | 707/501 |

OTHER PUBLICATIONS

Chekuri et al., Web Search Using Automatic Classification, 6$^{th}$ Intl. WWW conference, 4/7–11/97, http://www.scope.g-md.de/info/www6/posters/725/web_search.html (11 Pages).

* cited by examiner

*Primary Examiner*—Jean M. Corrielus
*Assistant Examiner*—Baoquoc N To
(74) *Attorney, Agent, or Firm*—Leonard Charles Suchyta; James K. Weixel

(57) ABSTRACT

Disclosed is a method and device for selecting documents, such as Web pages or sites, for presentation to a user, in response to a user expression of interest, during the course of presentation to the user of a document, such as a video or audio selection, whose content varies with time. The method takes advantage of information retrieval techniques to select documents related to the portion of the temporal document in which the user has expressed interest. The method generates the search query to use to select documents by reference to text associated with the portion of the temporal document in which the user has expressed interest, as by using the closed caption test associated with the video, or by using speech recognition techniques. The method further uses a weighting function to weigh the terms used in the search query, depending on their temporal relationship to the user expression of interest. The method uses a buffer to save necessary information about the temporal occurrence of terms in the temporal document.

24 Claims, 10 Drawing Sheets

HYPERVIDEO: INFORMATION RETRIEVAL USING REALTIME BUFFERS

TECHNICAL FIELD

This invention relates to techniques for retrieving material on the World Wide Web, and more particularly to methods of retrieving Web pages of interest to a user which relate to temporal material such as video programming.

BACKGROUND OF THE INVENTION

The Internet, of which the World Wide Web is a part, includes a series of interlinked computer networks and servers around the world. Users of one server or network connected to the Internet may send information to, or access information on, other networks or servers connected to the Internet by the use of various computer programs which allow such access, such as Web browsers. The information is sent to, or received from, a network or server in the form of packets of data.

The World Wide Web portion of the Internet comprises a subset of interconnected Internet sites which may be characterized as including information in a format suitable for graphical display on a computer screen. Each site may include one or more separate pages. Pages, in turn, may include links to other pages within the site, or to pages in other Web sites, facilitating the user's rapid movement from one page or site to another.

A number of the sites and pages accessed through the Web may consist entirely of "static" displays of text and/or images. These displays may reside on one or more host servers or networks, and may be accessed through the Internet for storage and/or display on a remote server or network. Other sites or pages may have changing advertisements or other similar material as well as "static" displays of text and/or images.

There are a number of techniques for permitting a user, while viewing one page or site on the Web, to request and be given access to other material that relates to the material being viewed, which can be applied when the material being viewed contains static text or image displays in whole or in part.

In addition to accessing static displays of text and/or images on the Web, it also may be possible to access material on the Web which is dynamic or changing. Such material will be referred to as "temporal documents" to reflect the fact that, unlike static material, their content as made available to or perceived by a user may change with the passage of time. Examples of such temporal documents are multimedia material such as video and audio programming, but there are other types of temporal documents as well. For example, the text of news bulletins, stock quotations such as would be seen on a "ticker tape", or sports scores may be made available; material such as this by its nature also may be changing as it is viewed, either because the underlying information is changing, or because the information is "scrolled" across the user's monitor, thus appearing as constantly changing with time. Other types of dynamic or changing material will also be apparent to one of ordinary skill in the art.

Temporal documents may have been previously created and stored on a server for later access (such as a movie, or a recording of a previously-occurring sports event) or a temporal document may reflect an event that is occurring "live" at the time the temporal document is transmitted over the Internet (such as a live news broadcast or sports event, or a stock ticker displaying real-time stock transaction information).

Whether the temporal document is previously-created or is being accessed live, it is useful to have a technique to facilitate a user obtaining material that relates to a portion of the temporal document he is viewing or listening to. Because the material is changing, however, some of the techniques that may be used to provide access to material that is related to a static page being viewed, may not be readily applicable to temporal documents.

Some previous methods of providing additional material related to changing content such as video programming have relied upon the prior manual choice of other Web documents, such as pages or sites, to be associated with particular portions of the video content. Then, when a particular portion of the video programming is reached, the related Web page or document may automatically be presented to the user, or the user may be informed of the availability of a link to the related material, and offered the choice of accessing it. Alternatively, no information about related material may be presented until or unless a user indicates interest during a particular segment of the video material (as by "clicking" with a mouse, or pressing a button); upon an expression of interest, the particular other Web page previously chosen as related to this portion of the video material may be presented to the user.

This method of associating related material to a temporal document has drawbacks, however. Because it requires the preselection of the associated material, it cannot be utilized with live material, or with material that has not been previously analyzed for the purpose. It also may be costly, in that it may require intensive manual manipulation of the multimedia material to choose other Web pages to associate with each portion of the video or audio material, and to carry out the association. It also may be rigid, in that once the selection is made it may remain unchanged regardless of whether other more appropriate related material becomes available. It may be both expensive and time-consuming to make changes once links have been established. Additionally, this method may offer a very limited choice to the user in that it may not be practical to offer a large number of links at each portion of the video or audio material.

Thus, there is a need for a method or device for permitting a user to obtain access to other material that is related to a portion of a temporal document (such as a video or audio program) being accessed on the Web, where the selection of the related material offered to the user is not made in advance, but is done automatically at the time the user expresses an interest in obtaining such material. Such a method or device makes "hypervideo" a practical concept.

One aspect of this need is a need for determining the portion of the temporal document about which the user would like to obtain additional information. In the case of a "static" display of material as might be presented to the user on a computer monitor, it may be possible to have the user indicate the material of interest by using a mouse or other similar selection device to maneuver a cursor on the monitor until it is superimposed on the portion of the display of interest, and then to "click" on the material of interest. In the case of a changing display, such as video, that may not be practical. For example, because it may take a certain amount of time for the user to decide that he is interested in obtaining additional material, and a certain amount of time to maneuver the mouse or other signaling device to indicate interest, the expression of interest may be delayed by a certain amount from the actual material in which the user is interested.

Another aspect of this need is a need for determining what other material is related to the material in which the user has expressed an interest. In the case of a static display which includes a display of text, it may be possible to have the user indicate the specific material in which he is interested (as by using a mouse to maneuver a cursor to the word or term displayed on the screen), and then to use that specific text as the basis of a search query using a conventional Web search engine. But in the case of video material, that may not be possible.

BRIEF DESCRIPTION OF DRAWINGS

The above-mentioned and other features of the invention will now become apparent by reference to the following description taken in connection with the accompanying drawings in which.

SUMMARY OF THE INVENTION

Figure 1:
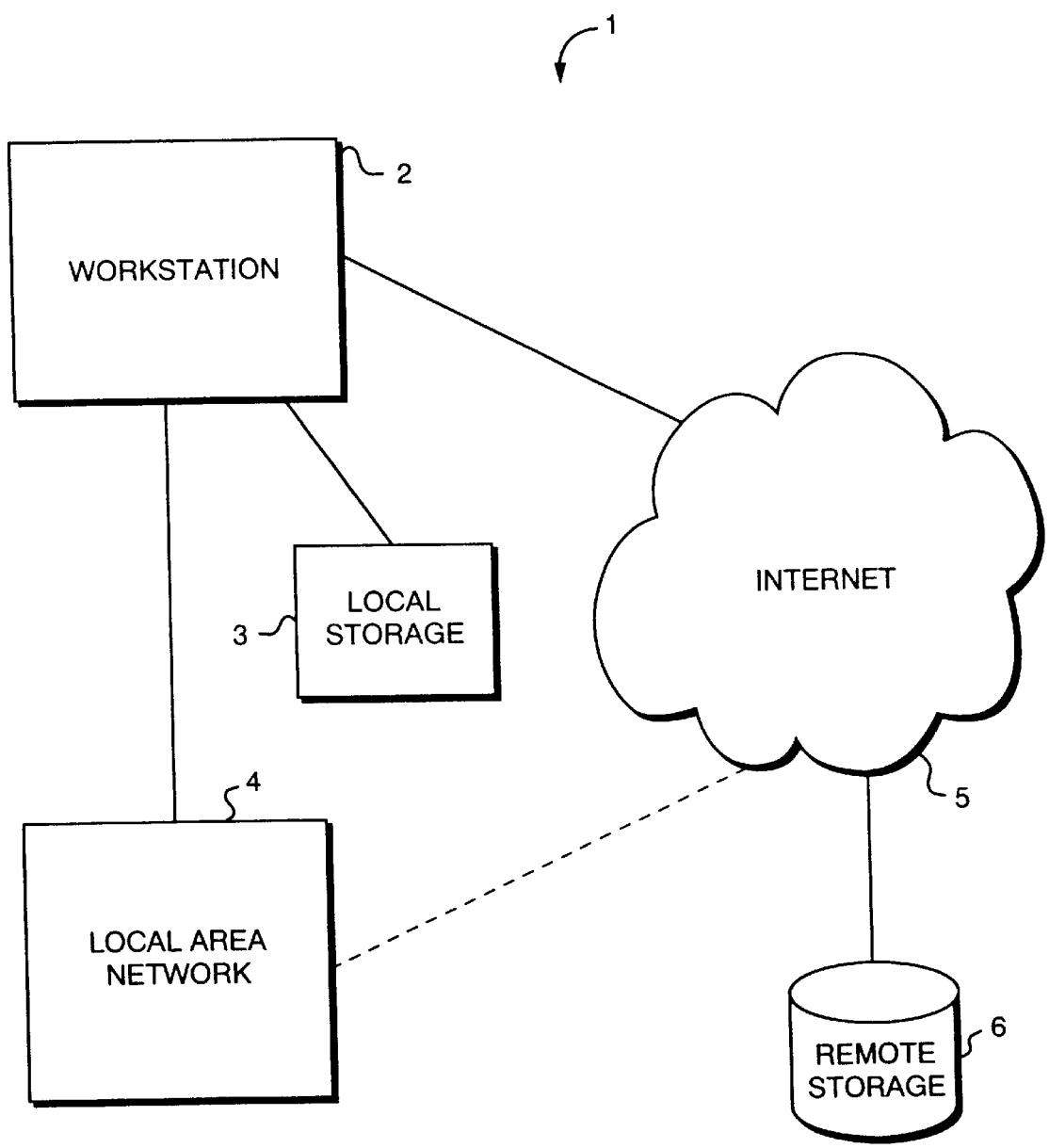
FIG. 1 is a schematic diagram of an embodiment of a computer system that may be operated according to the present invention.

According to the present invention, finding documents which relate to a portion of a temporal document includes (a) in response to a signal of interest at a particular time during the temporal document, identifying a portion of the temporal document for which related documents are to be found, (b) selecting text associated with the portion of the temporal document identified, by reference to a buffer wherein is stored each term in text associated with the temporal document, together with a time in the temporal document at which the term occurs, (c) weighting each term in the text selected by a function according to the time at which the term occurs relative to the time at which the signal of interest occurs, and (d) finding the related documents by use of information retrieval techniques applied to the text selected. Each term in the text associated with the temporal document may be determined as that portion of the document is accessed, and may be stored in a buffer together with the time in the temporal document at which the term occurs. The times at which the terms occur may be determined using the synchronization information contained in the temporal document. The temporal document may use the SMIL standard for synchronization of multimedia elements in a document. The buffer may have a fixed size such that it has sufficient capacity to hold all the terms which may occur in the temporal document during the time period that extends from when a signal of interest occurs to the earliest time prior to that for which the weighting function is nonzero. The fixed size of the buffer may be 8 kilobytes. Alternatively, the size of the buffer may be varied such that it has sufficient capacity at any given time to hold all terms which have occurred in the temporal document during a time period that extends back from the given time to an earliest time for which the weighting function would be nonzero for a signal of interest occurring at the given time. Terms and associated times may be stored in the buffer as if the buffer were a continuous loop, such that the buffer is filled in order, and when full a next entry is inserted at the beginning of the buffer. The temporal document may be video or audio material. The text stored in the buffer may be determined by the application of speech recognition techniques to the audio component of the portion of the temporal document identified, or may be the closed-caption text associated with the portion of the temporal document identified. The temporal document may include text, which text appearing to the user may vary with time, and the text selected may be that portion of the temporal document identified. The text may include news bulletins, weather, sports scores or stock transaction or pricing information. The temporal document may be being generated as it is being accessed. The weighting function W(t) may be equal for all times between a time $t_1$ before the signal of interest is given and a time $t_2$ before the signal is given, and may be zero for all other times. $T_1$ may be 2 seconds and $t_2$ 30 seconds. Alternatively, W(t) may be equal for all times between a time $t_1$ before the signal of interest is given and a time $t_2$ before the signal is given, and may decrease from $t_1$ until the time of the signal, and increase from a time $t_3$ before the signal is given to the time $t_2$, and may be zero for all other times. $T_1$, $t_2$ and $t_3$ may have specified values. W(t) may decrease linearly from the time $t_1$ until the time of the signal, and increase linearly from the time $t_3$ before the signal is given to the time $t_2$. W(t) may be a double exponential function of time. W(t) may equal 0 for all times earlier than 30 seconds before the signal of interest is given, and later than the signal of interest. The related documents may be accessed through the Internet. The related documents may be selected from among a collection of documents which may be accessed through the Internet, by utilizing databases comprising information about the collection. The related documents may be selected from the collection according to the scores achieved when evaluating documents in the collection according to a formula giving scores to documents depending upon the occurrence in the documents of terms which occur in text associated with the portion of the temporal document identified, where each term is weighted by the weighting function according to the time at which the term occurs relative to the time at which the signal of interest occurs. The terms which occur in the text which is associated with the portion of the temporal document identified, and the times at which the terms occur, may be obtained by reference to the buffer which contains the terms and the times in the video or audio material at which the terms occur. A predetermined number of documents, 1000, may be selected. A score $S_D$ of a document D in the collection may be determined by crediting the document D, for each term T in the temporal portion of the document identified which occurs in the document D, with an amount proportional to the weighting function, Robertson's term frequency $TF_{TD}$ and to $IDF_T$. The determination of the documents in the collection which receive the highest scores may be carried out using compressed document surrogates. The determination of the documents in the collection which receive the highest scores may be carried out by a server which is distinct from the server which receives the signal of interest.

DETAILED DESCRIPTION OF THE PREFERRED EMBODIMENT(S)

Referring to FIG. 1, a computer system 1 includes a workstation 2 having local storage 3. The workstation may also be connected to a local area network 4 and may access to the Internet 5. The Internet 5 may include or be coupled to remote storage 6. The workstation 2 may be any one of a variety of commercially available computers capable of providing the functionality described in more detail below. The local storage 3 may include ROM, RAM, a hard disk, a CD, or any other media capable of containing data and/or programs for the workstation 2 or other data. The local area network 4, which is coupled to and exchanges data with the workstation, may also contain data and/or program information for use by the workstation 2. The Internet 5 may be accessed in a conventional manner by the workstation 2. Alternatively, the workstation 2 may access the Internet 5 through the local area network 4, as shown by the dotted line of FIG. 1. The remote storage 6 may also contain data and/or program information for the workstation 2 or may contain other information, as will become apparent from the description below.

The system described herein permits a user (utilizing the computer system 1 which includes the workstation 2) who has accessed the Internet 5, either directly or through the local area network 4, to be given access to other material that is related to a temporal document, such as but not limited to video or audio material, the user is accessing. In one embodiment, the system includes software written in the Java language, running on a Hewlett Packard server connected to the Internet, as well as software written in the C language and in PERL running on an SGI O2 server connected to the Internet. Of course, it will be appreciated by one of ordinary skill in the art that the system may be implemented using a variety of computers and programming languages.

The system may be accessed by the user through the Internet 5 from his workstation 2 using a Web browser of conventional design, as would be familiar to one of ordinary skill in the art. The user then accesses a temporal document. In one embodiment, the temporal document is obtained from a collection of temporal documents previously prepared by the system and placed in a video library made available through a video server maintained in connection with the system. In this embodiment, the user may be permitted to choose the document in any one of a number of ways which will be known to one of ordinary skill in the art. The user may be given a list of documents which are available, and permitted to choose one, by clicking on it or indicating his interest in any one of a number of alternative ways which will be known to one of ordinary skill in the art. Alternatively, the user may be invited to search by using search engine or search query techniques such as will be familiar to one of ordinary skill in the art. Still other methods to permit the user to choose a document from among those in the library will be known to one of ordinary skill in the art. The user then may view (or listen to) the temporal document chosen through his work station 2 connected to the Internet 5.

In another embodiment, the temporal document may be obtained from another source on the Web. In this embodiment, the user may be permitted to employ a search engine which is maintained as part of the system to find and retrieve a document to the system. The search engine employed may be any one of a number of a type which will be familiar to one of ordinary skill in the art. The user then may view (or listen to) the temporal document chosen through his work station 2 connected to the Internet 5.

In another embodiment, the temporal document may be obtained from another source on the Web. In this embodiment, the user may be permitted to employ a search engine on his work station 2 connected to the Internet 5 to retrieve and view (or listen to) the temporal document chosen. The search engine employed may be any one of a number of a type which will be familiar to one of ordinary skill in the art. The user then may view (or listen to) the temporal document chosen through his work station 2 connected to the Internet 5.

The system utilizes IR (information retrieval) techniques to select the related material when interest in having access to such material is indicated. The system analyzes the content of a portion of the temporal document as to which the interest has been indicated, rather than pre-storing links to material which is determined to be related in advance.

The system may be utilized in connection with any material which has a characteristic that, when accessed by a user or viewer through the computer system 1 which may include the workstation 2, it changes with time. This includes but is not limited to video material and audio material, such as movies, news programs, and sports events. It may also include, for example, textual news bulletins that are displayed, either alone or superimposed on other content, or stock quotations or sports scores. These materials may be changing with time in that they are scrolled across the monitor for reading purposes, so that the portion of them accessed by the user changes with time.

If the material accessed is video material, whether collected into a video library and previously stored in a video server, or accessed from another location on the Internet, the video material may have been previously broadcast, and each video may have associated therewith closed captions which contain text that accompanies the video. The closed caption material may include the text of dialogue, or spoken words that accompany the video and constitute the audio track.

Included in the system is a technique that may be used to indicate when a portion of the temporal document in which there is interest has been reached. That a portion of the temporal document as to which additional, related material is desired has been reached, is indicated by means of a particular, preselected response being made after the portion of the document is displayed to the user. In one embodiment, a mouse is clicked, while in other embodiments software which recognizes and responds to voice commands may be employed, a particular key (or any key) on a keyboard may be depressed, or a button on a joystick may be pressed. Other methods of providing a signal to a computer system, known to one of ordinary skill in the art, may also be utilized.

Further included in the system is a technique which may be used, when a signal indicating interest in a portion of the document is given, to facilitate the determination of the portion of the temporal document in which the interest has been indicated, by utilizing the time at which the signal indicating interest has been given.

It is understood that a user may not be able to instantaneously think about the changing material that is being presented, make a decision that he is interested, and give the required signal. Moreover, it is understood that while the user sometimes may make a decision about interest based upon what appears or is heard at a particular instant, at other times the decision may be based upon a sequence of material presented over a period of time, rather than based upon the material at a particular instant.

For these reasons, the technique used in the system does not treat the content of the temporal document at the instant the signal is given as that portion of the temporal document in which there is interest, and therefore as a basis for finding related material. Rather, it is assumed that there is a delay between the material of interest first being presented to the user, and the indication of interest, and it is further assumed that the user is interested in material which extends over a period of time. In particular, it is assumed that the interest of the user in the content of the temporal document may be expressed as a function W(t) of the time t prior to the signal indicating interest being given.

Figure 2:
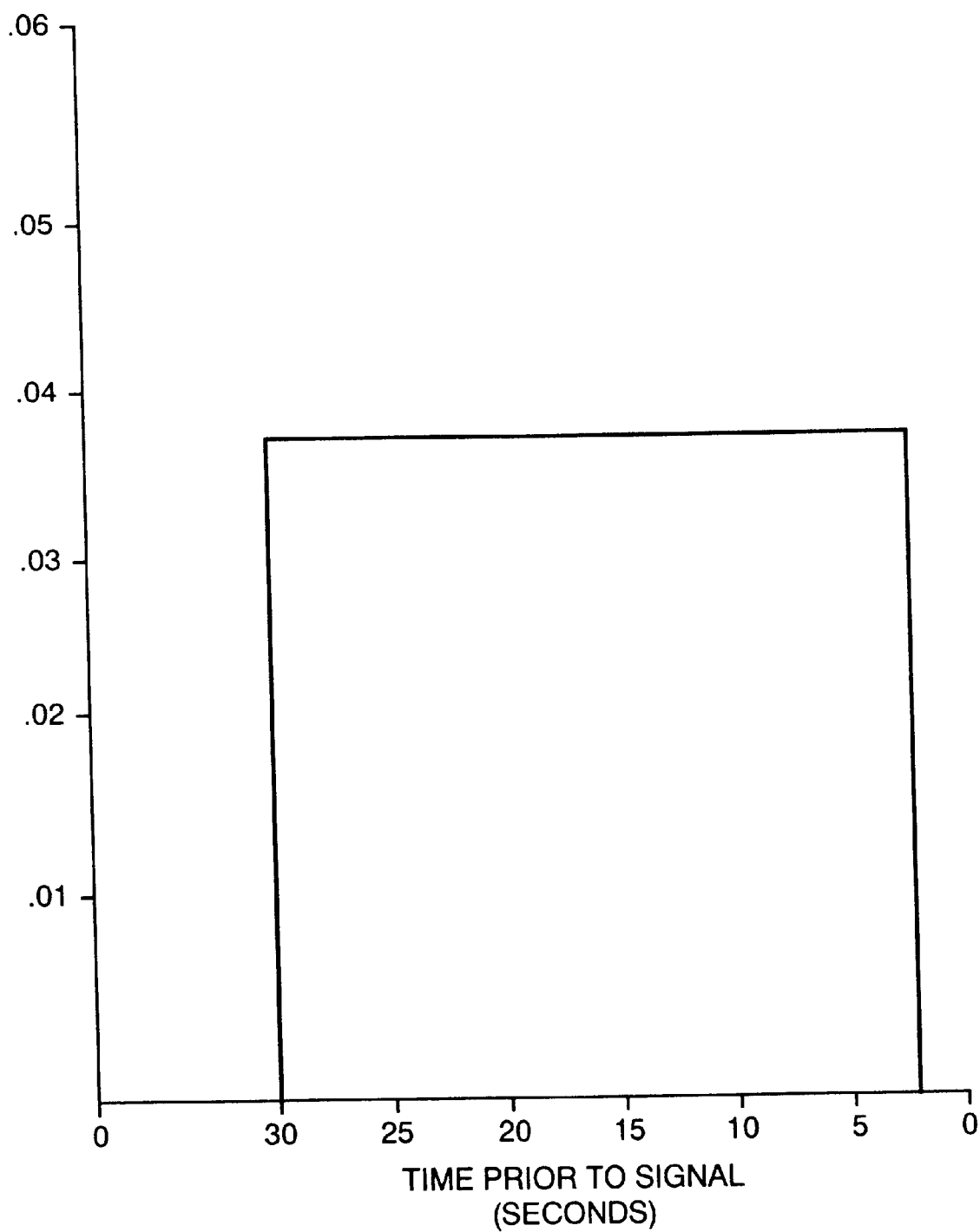
FIG. 2 is a diagram illustrating the weight to be assigned to different temporal portions of material such as video, based upon a user response at time $t_0$, according to one embodiment of the present invention.

In one embodiment of the system, it is assumed that there are characteristic fixed delay times $t_1$ and $t_2$, such that the interest of the user in the content of the temporal document begins at time $t_2$ before the indication of interest and ends at time $t_1$ before the indication of interest, and is equal between times $t_1$ and $t_2$. A diagram of the interest as a function of time W(t) in this embodiment is shown in FIG. 2. While other values of $t_1$ and $t_2$ may be used without departing from the spirit and scope of the invention, in this embodiment $t_1$=2 seconds and $t_2$=30 seconds.

Figure 3:
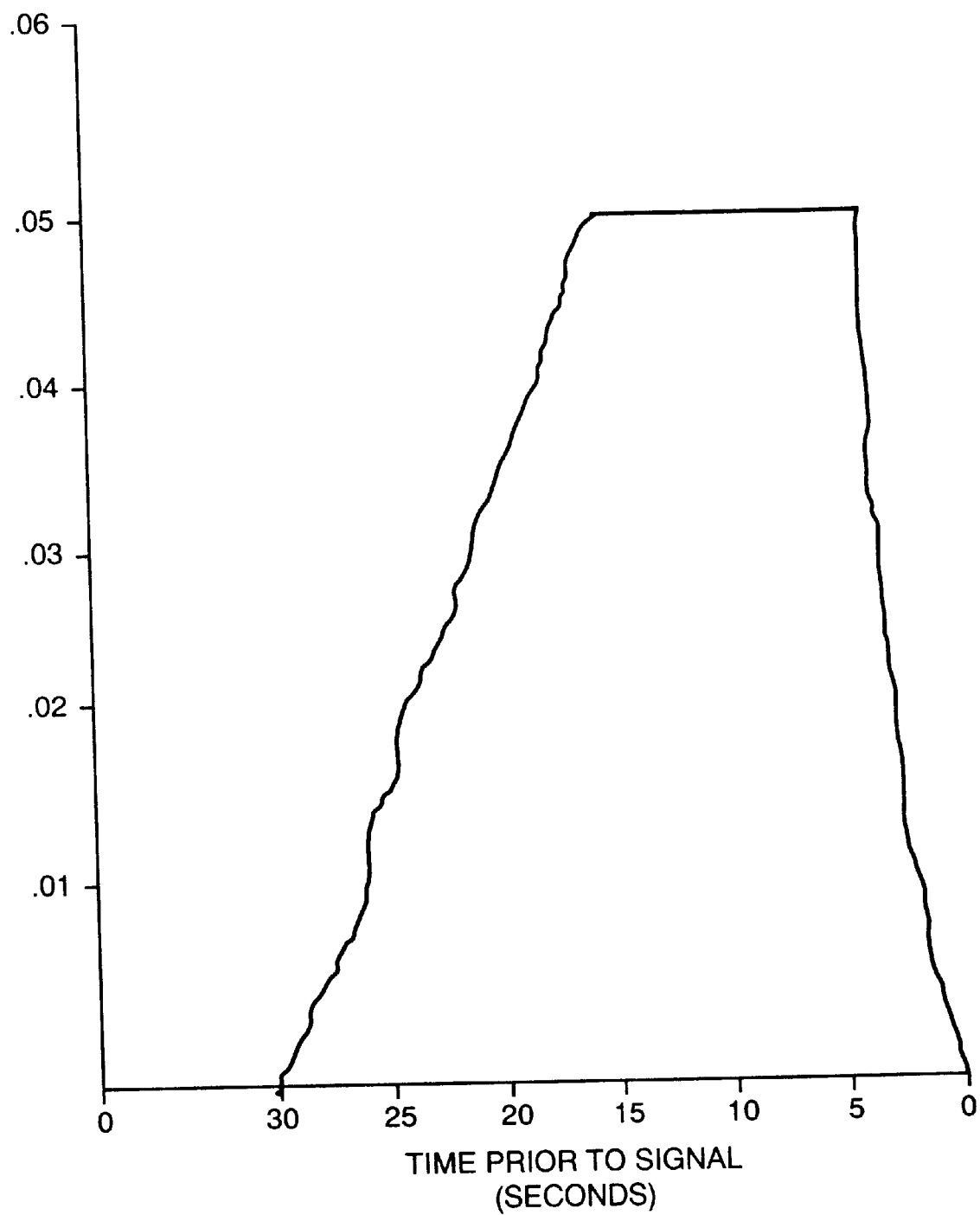
FIG. 3 is a diagram illustrating the weight to be assigned to different temporal portions of material such as video, based upon a user response at time $t_0$, according to another embodiment of the present invention.

In another embodiment, it is recognized that a more realistic model may assume more gradual and probabilistic decisionmaking and responses. In this embodiment, rather than assuming that there is no interest in any content from after the time $t_1$, it is assumed that there is some but lesser interest in material between the time $t_1$ and the time at which the interest is expressed and that the interest decreases from the time $t_1$ to the time at which the interest is expressed. In this embodiment, it is further assumed that there is some interest in content from earlier than time $t_2$, starting at a time $t_3$, and that the interest increases from the time $t_3$ to the time $t_2$. In this embodiment, it is further assumed that the interest may vary between times $t_2$ and $t_1$. A diagram of the interest as a function of time W(t) in this embodiment is shown in FIG. 3. While other values of $t_1$, $t_2$ and $t_3$ may be used without departing from the spirit and scope of the invention, in this embodiment $t_1$=2 seconds, $t_2$=15 seconds, and $t_3$=30 seconds.

Figure 4:
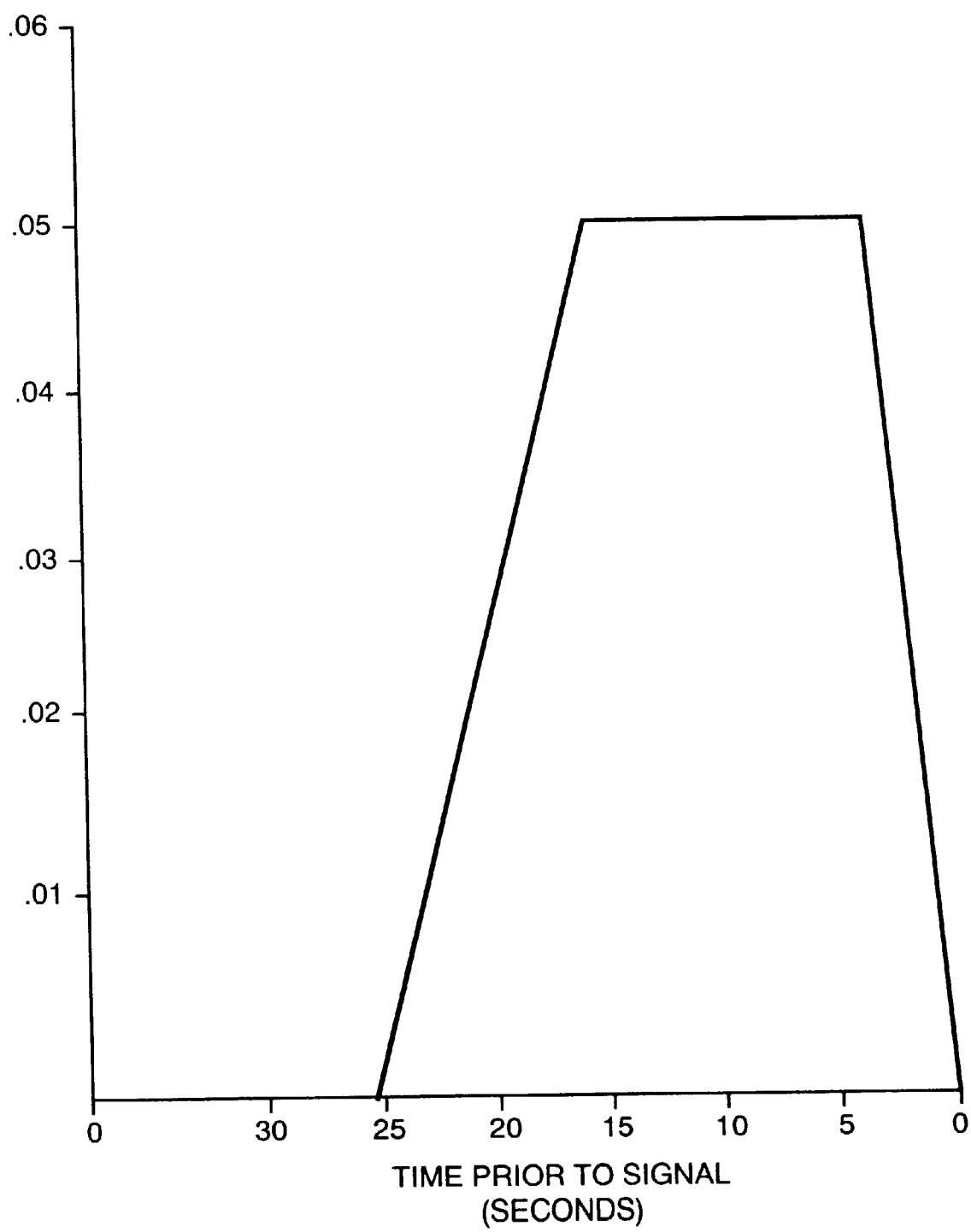
FIG. 4 is a diagram illustrating the weight to be assigned to different temporal portions of material such as video, based upon a user response at time $t_0$, according to a further embodiment of the present invention.

In yet another embodiment, for simplicity it is assumed that the interest in the content is equal between times $t_1$ and $t_2$, and it is assumed that the interest in content decreases linearly from the time $t_1$ to the time at which the interest is expressed In this embodiment, it is further assumed that the interest in content increases linearly from the time $t_3$ to the time $t_2$. A diagram of the interest as a function of time W(t) in this embodiment is shown in FIG. 4. While other values of $t_1$, $t_2$ and $t_3$ may be used without departing from the spirit and scope of the invention, in this embodiment $t_1$=2 seconds, $t_2$=15 seconds, and $t_3$=30 seconds.

In another embodiment of the system described herein, a discrete two stage exponential function is used to model the interest in content as a function of time, for the time period prior to at which the interest is expressed:

$$P_{t1,t2}(t) = \int_{k=0}^{t} (1 - \exp(-t_1)) * \exp(-t_1 k) * (1 - \exp(-t_2)) * \exp(-t_2(t-k))$$

Figure 5:
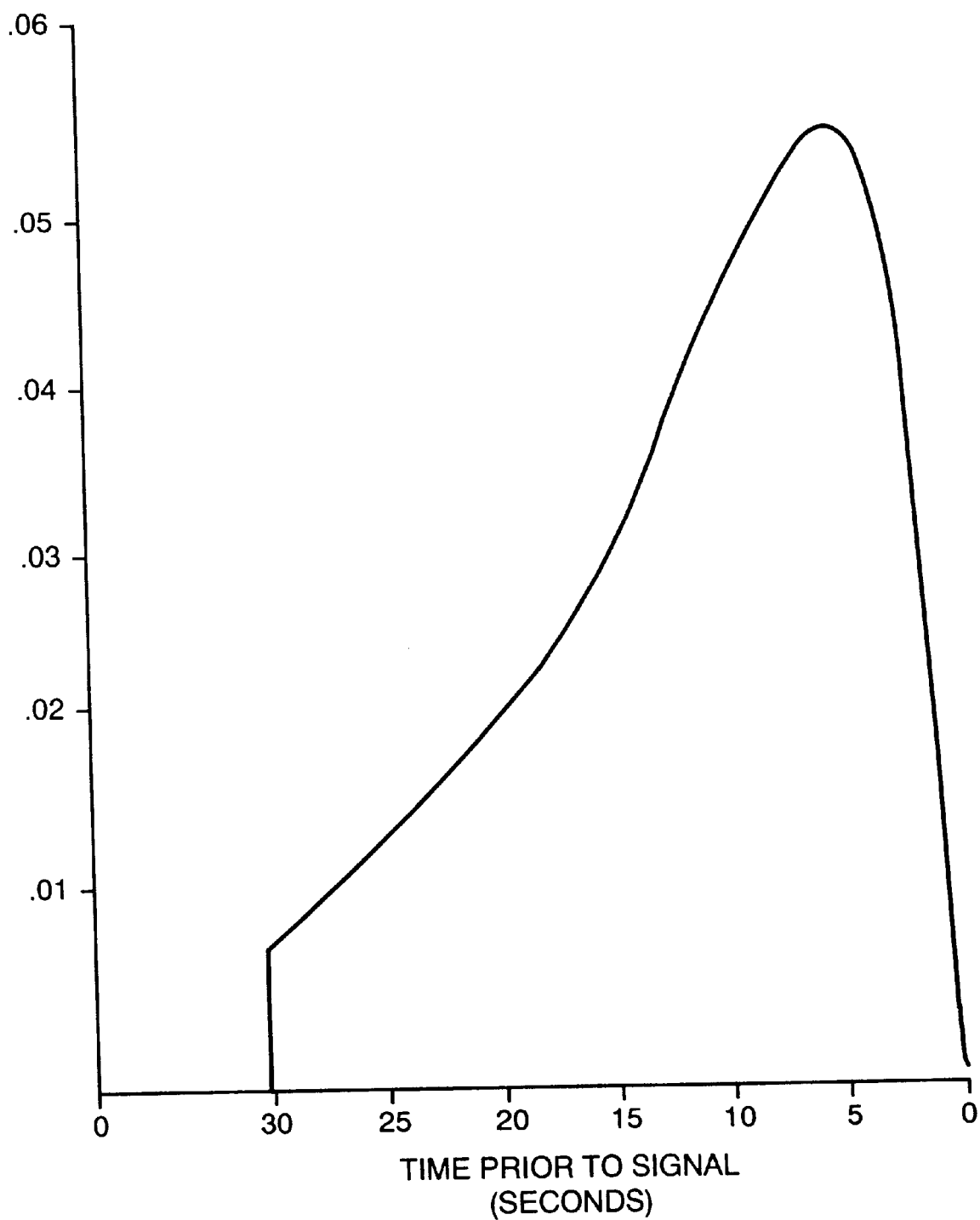
FIG. 5 is a diagram illustrating the weight to be assigned to different temporal portions of material such as video, based upon a user response at time $t_0$, according to a further embodiment of the present invention.

While other values of $t_1$ and $t_2$ may be used without departing from the spirit and scope of the invention, in this embodiment $t_1$=0.0001 and $t_2$=0.00025, where time is expressed in milliseconds. A diagram of the interest as a function of time W(t) in this embodiment is shown in FIG. 5, where time is expressed in seconds.

In the system described herein, the determination of what material may be related to the portion of the temporal document in which the user has indicated an interest may be made by using text associated with that portion of the temporal document which has been identified by means of applying the above aspect of the system.

The text to be utilized may be obtained in a number of ways. If the temporal document itself comprises text, such as breaking news bulletins displayed visually on a portion of the computer monitor, a portion of the text that is associated with the portion of the temporal document which has been identified may be utilized. If the content includes symbols, such as stock prices displayed using abbreviations to identify the company, a portion of the symbols that is associated with the portion of the temporal document which has been identified may be converted to text, and the text utilized.

If the temporal document is a video or audio program, a number of different techniques may be utilized to obtain relevant text. In one embodiment, text which results from the application of speech recognition software to the portion of the audio program which has been identified, or the audio component of the portion of the video program which has been identified, may be used. Speech recognition software of a kind familiar to one of ordinary skill in the art may be used.

In another embodiment, relevant text may be obtained by use of the closed caption information which is associated with the portion of the video programming which has been identified. If this is done, and the original video material was analog, the closed caption text may be extracted from the analog video by use of a commercially available closed caption decoder that will be familiar to one of ordinary skill in the art such as that available from Link Electronics.

In the system described herein, if a collection of temporal documents is previously prepared by the system and placed in a video library to be made available through a video server maintained in connection with the system, when the temporal documents are placed in the video library a table is created and stored for each temporal document which contains each term contained in the text of the document, in the order in which the terms occur in the text temporally, and associated and stored in the table with each term is the time t at which the term occurs in the temporal document.

If a temporal document utilizes the Synchronized Multimedia Integration Language (SMIL) standard for delivery of synchronized temporal media, the existing synchronization information in the document may be utilized to extract the times at which the terms occur. The method of doing so will be apparent to one of ordinary skill in the art. (SMIL is defined using the XML standard and allows the layout of temporal media to be specified, as well as the synchronization of multiple temporal media streams. SMIL provides synchronization elements whereby begin and end times as well as durations and synchronization points can be specified for multiple media streams. The use of the SMIL synchronization information allows the content of one stream, such as closed caption text, that occurs contemporaneously with the content of another stream, such as video, to be extracted. The SMIL 1.0 specification may be found at www.w3.org/TR/1998/REC-smil-19980615)

If the temporal document uses a synchronization method other than SMIL for its multimedia content, the synchronization information generated by that method may be used to extract the times at which the terms in the closed caption text occur.

If the original temporal document was video which was obtained in analog form, and it is desired to utilize the closed caption, a commercially-available closed caption decoder of a type familiar to one of ordinary skill in the art, such as that available from Link Electronics, may be used.

The text associated with the portion of the temporal document which has been identified is used to locate other material that may be related to that portion of the temporal document in which interest has been indicated. This is done by using the associated text as a basis for a search query on a database of documents located on the Web. The documents in the database include but need not be limited to Web pages or sites.

In order to improve the relevance of the material thus selected, a term in the text which occurs at a time t relative to the time at which the interest has been indicated is weighted in the search query by the function W(t).

Depending upon the form of the function W(t), and other considerations which will be apparent to one of ordinary skill in the art, in order to reduce the time required to apply the search query it may be determined to include only times t for which the function W(t) is greater than a predetermined quantity, or only times t within a specified time prior to the indication of interest. In one embodiment, where the function W(t) is a discrete two stage exponential function in which time is expressed in milliseconds, and $t_1=0.0001$ and $t_2=0.00025$, only times t within 30 seconds (30,000 milliseconds) before the indication of interest are included in the analysis.

In this embodiment, if the temporal document involved is one which previously has been placed in a video library and made available through a video server maintained in connection with the system, the terms to be included in the search query are selected by consulting the table for the temporal document which contains all terms in the text associated with the document, and the times at which the terms occur, and choosing all terms which occur within the 30 seconds before the indication of interest.

While other search query methods known to persons of ordinary skill in the art may be utilized to find relevant material, in the preferred embodiment Robertson's term frequency score is employed.

In this embodiment, the search query is run on the collection of documents from which the relevant material is to be drawn, and a document D in the collection is given a score as follows:

$$S_D = \sum_{\text{terms } T} W(t) * TF_{TD} * IDF_T,$$

where:
$S_D$ is the total score for a document D,
W(t) is the weight assigned to term T which occurs at time t $$TF_{TD} = \text{Robertson's term frequency for Term } T \text{ in Document } D$$
$$= N_{TD} / (N_{TD} + K_1 + K_2 * (L_D / L_0)),$$

where:
$N_{TD}$ is the number of times the term T occurs in document D,
$L_D$ is the length of document D,
$L_0$ is the average length of a document in the collection of documents indexed, and
$K_1$ and $K_2$ are constants. ($K_1$ typically may be assigned a value of 0.5, and $K_2$ 1.5, but these values may be varied without departing from the spirit and scope of the invention.)

and $$IDF_T = \log((N+K_3)/N_T)/\log(N+K_4)$$

where:
N is the number of documents in the collection,
$N_T$ is the number of documents containing the term T in the collection,
$K_3$ and $K_4$ are constants. ($K_3$ typically may be assigned a value of 0.5, and $K_4$ 1.0, but these values may be varied without departing from the spirit and scope of the invention.)

This particular formula is by no means the only formula that may be used to analyze documents for relevance. Other formulae will be apparent to one of ordinary skill in the art. For example, the weight to be assigned to a term in the search query may be adjusted depending on whether, and how frequently, in relative or absolute terms, the term occurs in the portion of the temporal document which falls outside the time boundaries used for determining whether a term is to be included in the search query.

Documents are then ranked in order of their scores $S_D$, and the highest-ranking documents are returned to the user as relevant to the portion of the temporal document in which he has expressed an interest. (While any number of documents may be returned, in the one embodiment 1000 is the maximum number that will be returned.)

The search may be carried out by the same server which has received the signal from the user, selected the text which is to be utilized in the query, and determined the weights to be assigned to each term in the text by reason of its temporal relationship to the signal of interest. In one embodiment, however, the query is processed by an IR server, while the other functions—receipt of the signal of interest, determination of the text to be the query, and temporal weighting of the text—are carried out by a separate QSE (query string extractor) server.

The documents in the collection which is utilized as the basis for the processing of the query may be selected for inclusion in the collection by any one of a number of methods that will be familiar to one of ordinary skill in the art. For example, the documents may be selected by a processing of automatically spidering the Web and indexing pages and sites thus located and determined to meet predetermined criteria. Techniques for developing programs to spider the Web will be known to one of ordinary skill in the art, and are described for example in Web Client Programming in PERL, Clinton Wong, O'Reilly and Assoc., 1997. For example, only sites that relate to specific subjects, such as electronic commerce, may be selected for inclusion in the collection, or only sites judged suitable for access by children of a certain age range. The documents included in the collection could include (or could be limited to) other video or audio materials, and/or text.

In processing the query, it is useful to take advantage of certain other aspects of the system to make the search quicker and more efficient. These aspects respond to problems which arise out of the fact that many common schema for the retrieval of Web documents of interest (including but not limited to Web pages or sites) rely upon the use of inverted term lists to maintain information about the use of various terms in the documents, but do not maintain information about the documents themselves, other than through the inverted term lists.

Figure 6:
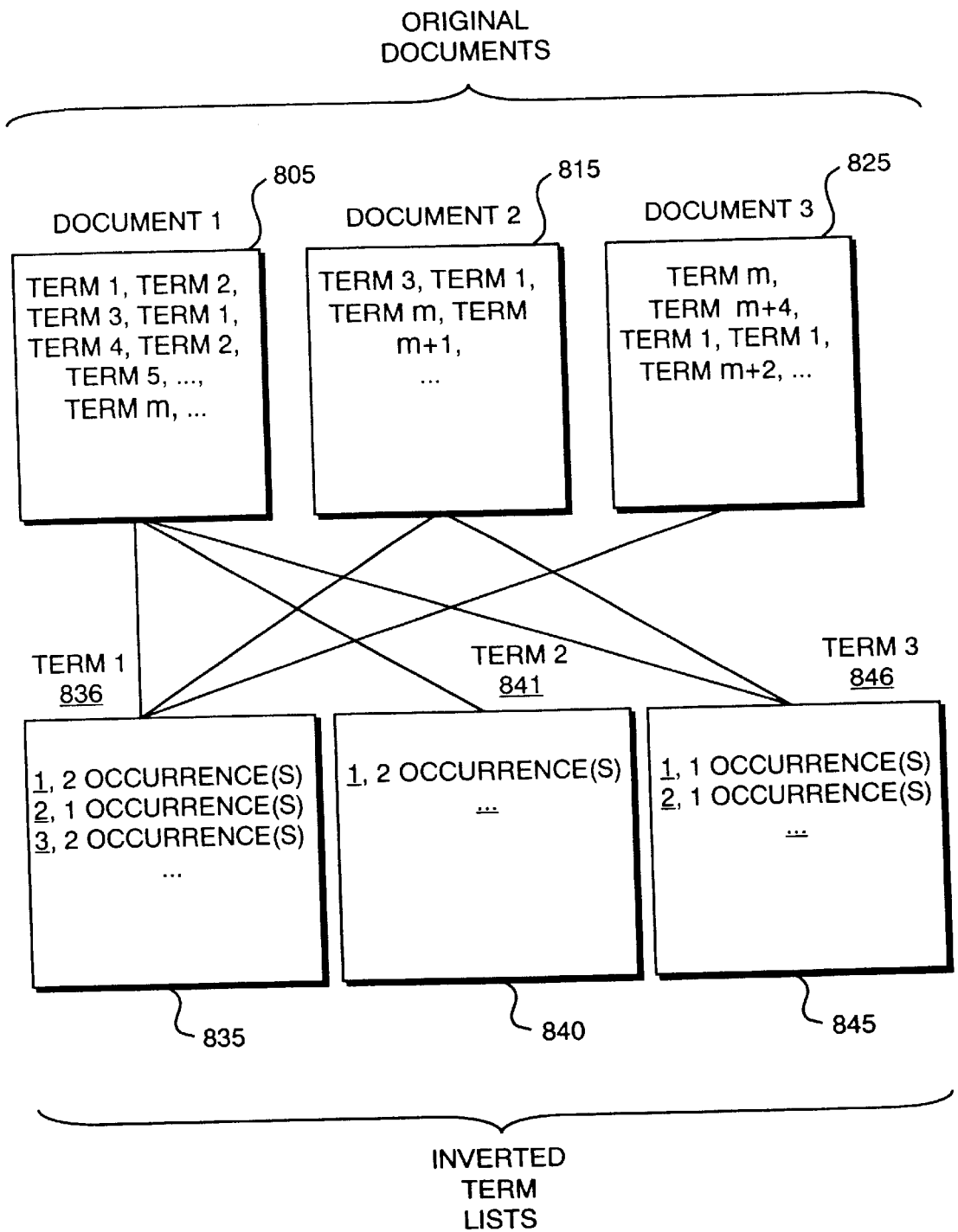
FIG. 6 illustrates a conventional (prior art) relationship between documents and inverted term lists.

In order to understand these aspects, it is appropriate first to describe the structure of a conventional inverted term list, and its relationship to the underlying collection of documents about which it contains information. FIG. 6 illustrates one possible conventional relationship between underlying documents in a document collection, such as, but not limited to, the Web or a portion thereof, and associated inverted term lists which may be used to facilitate the retrieval of desired documents from the collection. Either Web sites or Web pages may be treated as documents.

In constructing inverted term lists, it is useful to decide what terms should be included. It may be determined to store information with respect to all terms which occur in documents in a collection, or it may be determined to exclude common words such as "the" and "and," or it may be decided to store information only about certain specified terms, such as those which may occur in a particular field such as a scientific or technical discipline. (A term may be a word, a number, an acronym, an abbreviation, a sequential collection of the above, or any other collection of numerals, letters and/or symbols in a fixed order which may be found in the documents in the collection to be searched.) In general, terms that are considered to be useful for purposes of retrieving documents may be selected.

An inverted term list may be created for each term of interest that is found to occur in any of the documents in the collection. In the example illustrated in FIG. 6, inverted term lists 835, 840, 845 identify, by means of providing a unique document identifier number, every document from the collection in which corresponding terms 836, 841, 846 occur, and state how many times each of the terms 836, 841, 846 occurs in the document. Thus, in FIG. 6 the inverted term list 835 corresponding to the term 836 states how often the term 836 occurs in each of the documents 805, 815, 825 in the collection. In this example, the inverted term list 835 for the term 836 contains an entry for the unique document identifier number of the first document, "1", and states that the term 836 occurs twice in Document 1 805, then an entry for the unique document identifier number, "2", of the second document, and a statement that the term 836 occurs once in Document 2 815, then an entry for the unique document identifier number, "3", of the third document, and a statement that the term 836 occurs twice in Document 3 825, and so on. It will be appreciated by one of ordinary skill in the art that inverted term lists may also contain other information as well, as will be discussed below.

Inverted term lists may be stored as linked lists, or they may be fixed arrays. Other equivalents will be apparent to those of ordinary skill in the art.

Figure 7:
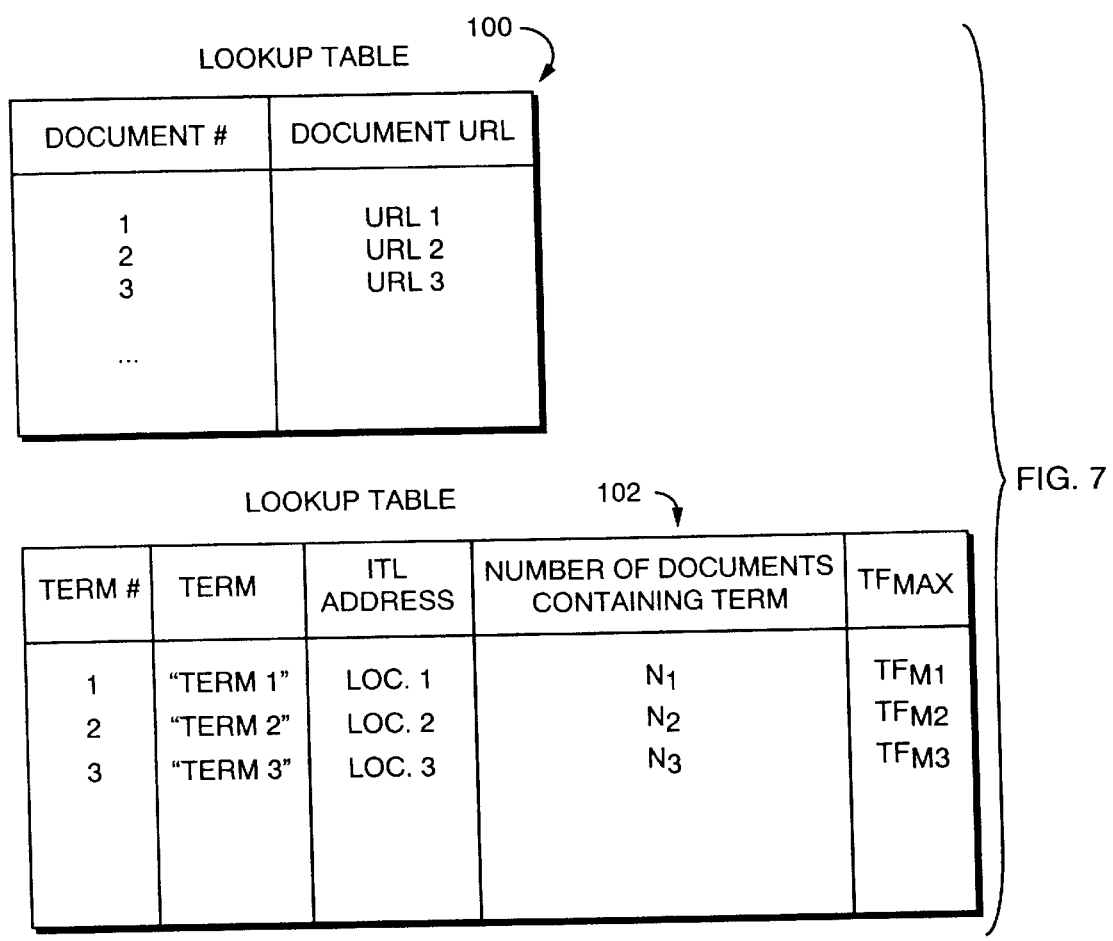
FIG. 7 illustrates conventional (prior art) lookup tables which may be used in conjunction with inverted term lists.

Lookup tables may be created in connection with inverted term lists. One lookup table which may be created may provide the locations in the document collection of the documents whose contents have been indexed in the inverted term lists; in the case of Web pages or sites, the URLs of the pages or sites may be provided. An example of such a lookup table 100 is shown in the upper portion of FIG. 7. The document URLs may be stored in the lookup table in the order of the unique document identifier numbers of the documents. Then, if the inverted term lists include the document identifier numbers of the documents having the term in question, and the lookup table is maintained as a fixed array, the location in the lookup table array of an actual document URL may be determined directly from the document identifier number.

If such a lookup table is not created, inverted term lists may contain the locations in the document collection, such as the URLs, of the documents which contain the term in question.

Another lookup table may provide information about the terms for use when searches for relevant documents are done using the inverted term lists. An example of such a lookup table 102 is shown in the lower portion of FIG. 7. For each term, this lookup table may contain the English (or other natural language) term itself, the address of the inverted term list for the term, and other information which may be of use in using the inverted term lists to rank documents for relevance, such as, but not limited to, the number of documents in the collection in which the term occurs, the number of times the term occurs in documents in the collection, and the maximum term frequency score for the term in any one document in the collection.

The term frequency scores for the term may be calculated based on any one of a number of formulae which will be familiar to one of ordinary skill in the art, such as but not limited to Robertson's term frequency formula:

$$TF_{TD}=N_{TD}/(N_{TD}+K_1+K_2*(L_D/L_0)),$$

where $N_{TD}$, $L_D$, $L_0$, $K_1$ and $K_2$ have the values set forth above.

The terms may be stored in this lookup table in any order, such as alphabetical order. For ease of reference they may be stored in the numerical order of unique term identification numbers assigned to each term. If this is done, and the lookup table is maintained as a fixed array, the location of information about a term in the lookup table may be determined directly from the term identification number of the term.

The inverted term lists also may contain the number of documents in the collection in which the term occurs, the number of times the term occurs in documents in the collection, and/or the maximum term frequency score for the term in any one document in the collection, if this information is not maintained in the lookup table which contains the address of the inverted term list for the term. The inverted term list for a term also may contain, not simply the number of times the term occurs in a particular document, but the location in the document at which the term occurs.

A single inverted term list may be maintained for each term of interest. Alternatively, in order to permit more expeditious responses to search queries, two inverted term lists may be maintained for each term of interest. The first, or "top" inverted term list, may contain information about an arbitrary number of documents, such as 1000, which have the highest term frequency scores for the term. The second, or "remainder" inverted term list, may contain information about the occurrence of the term in the remaining documents. (If separate top and remainder inverted term lists are maintained, then a lookup table 102 which contains the maximum term frequency scores for terms may contain separate maximum term frequency scores for documents on the term's top inverted term list and for documents on the term's remainder inverted term list.)

In the inverted term lists, information about documents may be stored in order of the term frequency score for the documents, so that the documents with the highest term frequency scores are placed at the top of the inverted term list.

In order to facilitate execution of search queries using inverted term lists, a compressed document surrogate may be used for storing information about a document that is part of a collection of documents of potential interest. This may be illustrated as applied to a case where the documents of interest are Web pages, but persons of ordinary skill in the art will recognize that it may equally be applied to collections of Web sites or of other varieties of computerized documents.

As is the case in creating inverted term lists, it may be determined to store information with respect to all terms which occur in documents in a collection, or it may be determined to exclude common words such as "the" and "and," or it may be decided to store information only about certain specified terms, such as those which may occur in a particular field such as a scientific or technical discipline. If the compressed document surrogates are to be used in conjunction with inverted term lists, the same set of terms which the inverted term lists cover may be used in the compressed document surrogates. (Hereinafter, the set of terms about which it has been determined to store information are referred to as the "terms of interest.")

If inverted term lists are not created for multiword terms, and the inverted term lists and compressed document surrogates do not maintain information about the location of terms in a document, but it is desired to be able to search for multiword terms, the compressed document surrogates may include multi-word terms which are omitted from inverted term lists. If this is done, a search for a multiword term may be performed by searching for each word in the term, and then consulting the compressed document surrogate of any document found to contain the individual words, to determine if the desired multiword term is in the document.

A compressed document surrogate for a particular document comprises a table of desired information about all of the terms of interest which occur in the document, in a suitable order. This desired information may include the number of times the term occurs in the document, and/or the term frequency score for the occurrence of that term in that document, according to Robertson's term frequency formula or any other formula, and/or the location in the document (in absolute terms or relative to the prior occurrence) of each occurrence. (Other relevant information may be added at the discretion of the user without departing from the spirit or scope of the invention.) Alternatively, a compressed document surrogate may simply indicate that a term occurs in the document, with no further information about specific occurrences or about the number of occurrences. A compressed document surrogate may provide the address of the inverted term list for each term of interest which occurs in the document, and/or the address of the location in the inverted term list of the entry for that document. Alternatively, a compressed document surrogate may provide the address of a location in a lookup table of a term of interest which occurs in the document, or information, such as a term identification number, from which the address of a location in a lookup table of the term may be determined.

Figure 8:
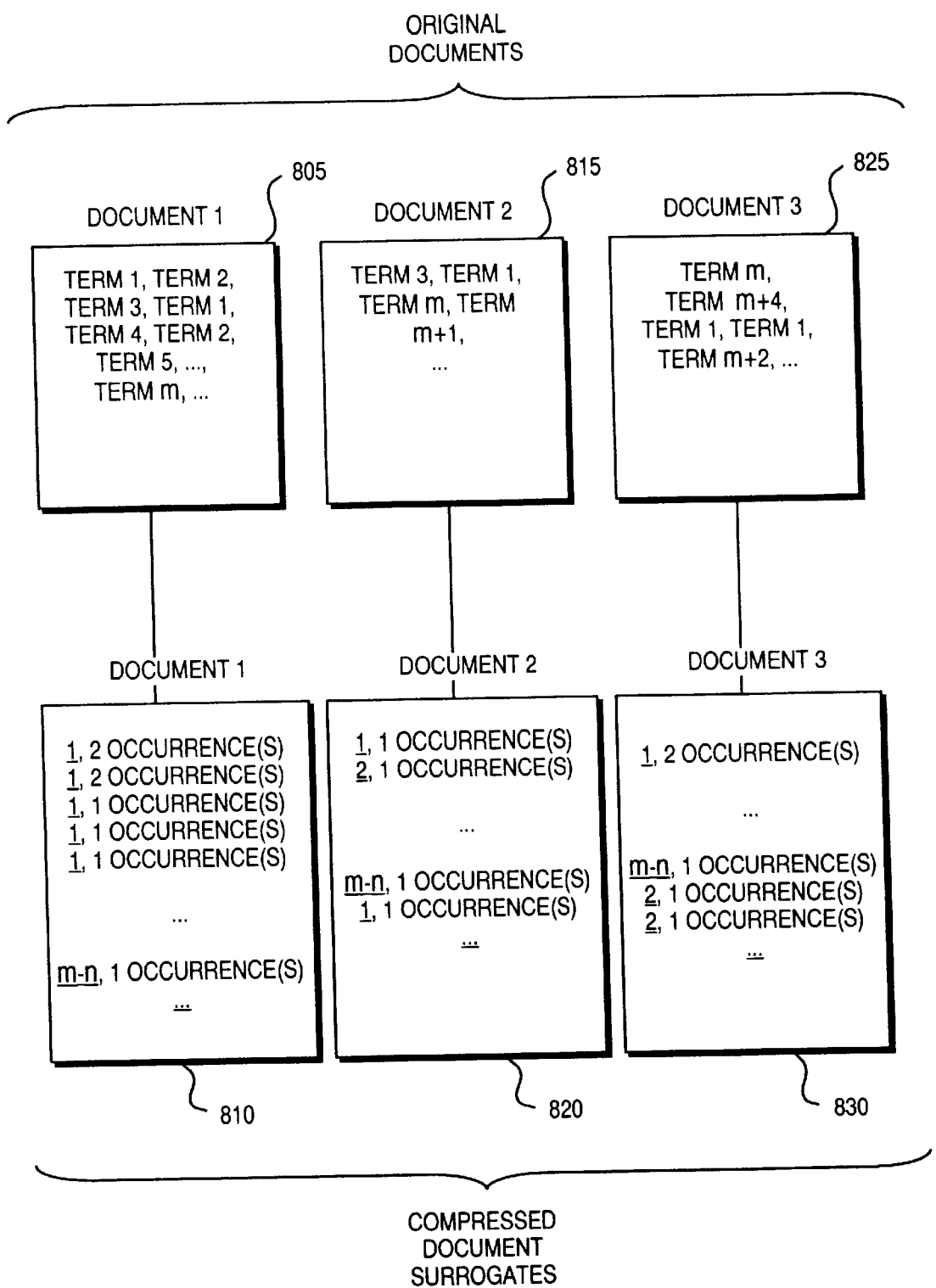
FIG. 8 illustrates a relationship between documents and compressed document surrogates

In the preferred embodiment of a compressed document surrogate illustrated in FIG. 8, it is determined to store information about all terms which occur in documents, other than specified common words. In this embodiment, it is further decided that a compressed document surrogate for a document shall identify each term of interest found in the document, and specify how many times the term occurs in the document, but shall provide no further information about the occurrence of terms in the document.

In this embodiment, the term information in the document surrogates is stored in order of term identification number. Each term is assigned a unique integer identification number. (Term identification numbers are assigned to terms in the order in which the terms are first encountered in the course of constructing the table and associated inverted term lists, so that the first term found in the first document indexed is assigned the term identification number "1", and so on. Since terms are assigned unique term identification numbers, when a term already assigned a term identification number is encountered again, either in the same or in a subsequent document, no new term identification number is assigned to it.) Rather than storing the term identification numbers themselves, the differences from the previous term identification numbers are stored. For example, the following indicates that Term 1 appears 5 times, Term 10 appears 1 time, and so forth:

(1,5) (10,1) (30,2) (50,3) (100,4).

In the preferred embodiment, where the differences or offsets from the previous term identification numbers are stored, what is actually stored is:

(1,5) (9,1) (20,2) (20,3) (50,4).

By storing the differences instead of the term identification numbers, the numbers to be stored will be considerably smaller. This allows the surrogate to be compressed by using a variable length encoding of the integer values. The differences are encoded using Golomb coding. (Golomb, S. W. 1966. Run-length encodings. IEEE Transactions on Information Theory, vol. 12 no. 3 pp 339–401)

The term counts are encoded in unary, i.e. the number 1 is encoded as 0, 2 is encoded as 10, 3 as 110 etc. Someone of ordinary skill in the art will recognize that other variable length encodings may also be used to encode these values.

By compressing the differences and counts, the document surrogates can be stored in only 10% of the space required by the original text. Similarly, if one were to store the within document position in the surrogate, the difference from the previous position would be stored rather than the absolute position. (Thus, a term occurring in positions 1, 3, 5, and 10 in a document will have this information stored as 1, 2, 2, 5.) As before, the smaller average sizes allow the information to be encoded in fewer bits, thereby saving space.

Thus, in FIG. 8, a surrogate 810 lists a term identification number, "1", of a first term, Term 1, used in a document 805, and the number of occurrences (two) of Term 1 in the document 805. The surrogate 810 then lists the difference between the term identification number, "1" of the first term, and the term identification number "2" of a second term, Term 2, which occurs in the document 805, namely "1", and the number of occurrences (two) for Term 2 in the document 805, reflecting that that term is present in the document 805. The surrogate 810 then lists the difference between the term identification number, "2" of the second term, and the term identification number "3" of a third term, Term 3, which occurs in the document 805, namely "1", and the number of occurrences (one) for Term 3 in the document 805, reflecting that that term is present in the document 805. Note that the surrogate 810 only contains a single entry for Terms 1 and 2, even though the terms occur more than once in the underlying document 805. Similarly, a surrogate 820 for a second document 815 lists the term identification number, "1", of Term 1, and the number of occurrences (one) of Term 1 in the document 815, because Term 1 is present in the Document 815, but the surrogate 820 does not list Term 2, because Term 2 is not present. The surrogate 820 then lists the difference between the term identification number, "3", of Term 3, and the term identification number of Term 1, "1", namely "2", and the number of occurrences of Term 3, because Term 3 is present, and so on.

Terms may be stored in a surrogate in any suitable order, such as but not limited to alphabetical order. In the preferred embodiment described here, the terms are stored in order of term identification number. In the preferred embodiment, in order to conserve space, further information about terms is stored in a lookup table 102 of the type illustrated in the lower portion of FIG. 7. The location in the lookup table of information concerning the term of interest may be determined from the term identification number, in that the term lookup table is a fixed array and terms are stored in the table in order of the term identification number. For each term, the term lookup table identifies the actual term and contains further information about the term, such as the location of an inverted term list for the term, the number of documents in the collection in which the term occurs, and the maximum term frequency scores for the term in any one document in the term's "top" inverted term list, and in any one document in the term's "remainder" inverted term list.

In the system described herein, compressed document surrogates may be utilized to reduce the time required to determine the score for a document with respect to a given search query. Conventionally, the score for a document, with respect to a given search query, is determined by searching the inverted term lists for all of the terms in the query. Because it is not known prior to beginning such a search which of the terms in the query is in the document, it is necessary to search the inverted term lists for all of the terms in the query to determine the score for a document. Finding whether a given document occurs in an inverted term list may be a relatively time-consuming process, if there are many terms in the query.

Figure 9:
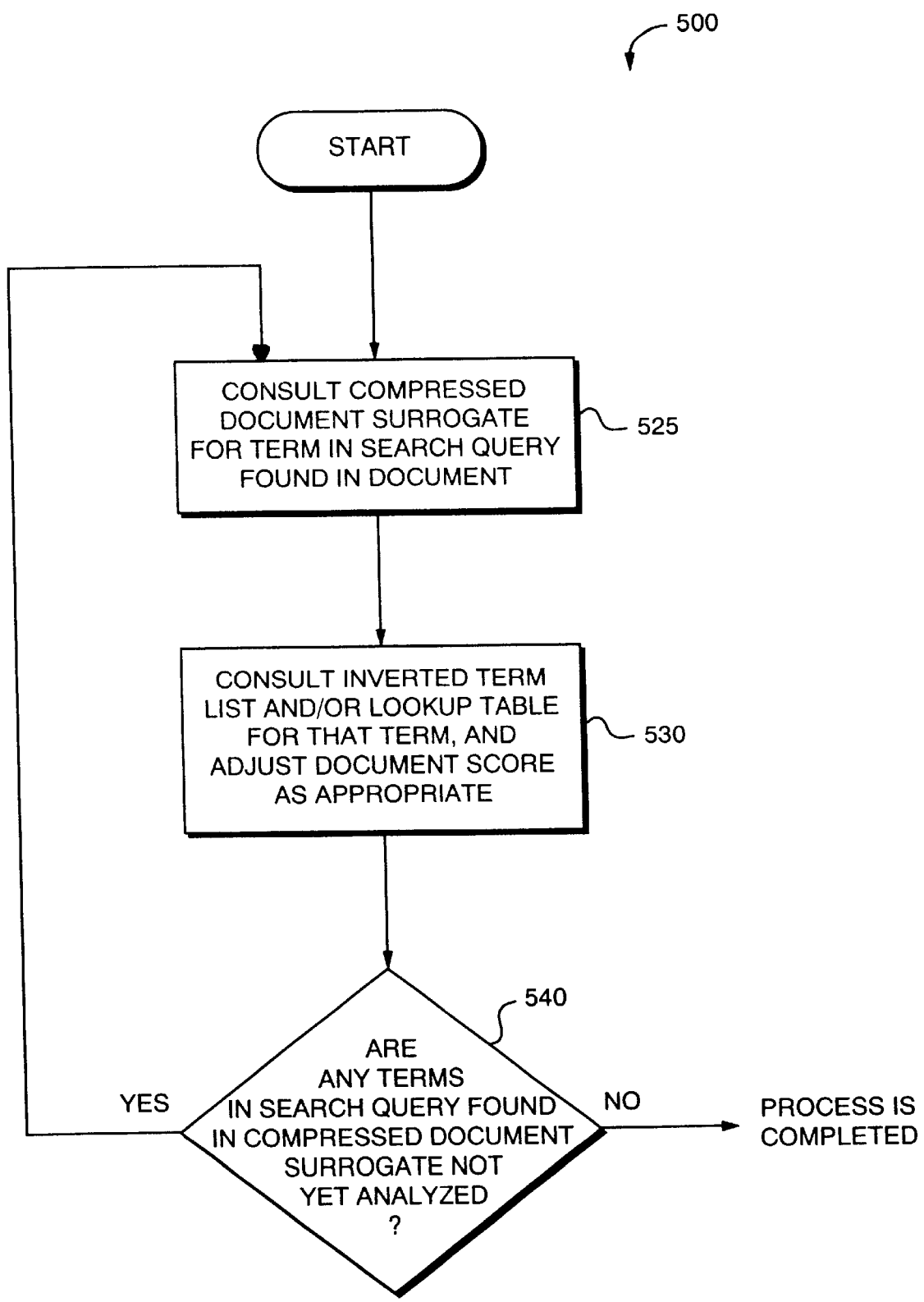
FIG. 9 is a flow chart which illustrates a process by which a document score may be calculated, using compressed document surrogates.

Inverted term lists, however, may permit a document score to be determined more quickly by the use of the document's compressed document surrogate. Referring to FIG. 9, a process 500 begins at a step 525 by examining a compressed document surrogate for a document to be scored with respect to a particular search query. A term in the search query which occurs in the document is identified by using the compressed document surrogate. Then, a step 530 calculates the score resulting from the occurrence of the term in the document by consulting, if necessary, a lookup table and/or inverted term list for the term. Then, a step 540 determines whether any other terms in the search query, which are found in the compressed document surrogate, have not yet been analyzed. If all terms in the search query that are found in the compressed document surrogate have been analyzed, the process 500 is completed. Otherwise, the process 500 continues by returning to the step 525 to choose the next term in the search query which occurs in the document and has not yet been analyzed, and then doing the appropriate calculation and adjustment of score.

In the preferred embodiment, at the step 530 it is not necessary to consult the inverted term list for the term, since the number of occurrences of the term in the document is known from the compressed document surrogate, and the remaining information necessary to calculate the document's score may be determined from the term lookup table by use of the term identification number in the compressed document surrogate, without the need to refer to the inverted term list itself.

A further aspect of the system described herein which takes advantage of compressed document surrogates to facilitate carrying out search queries to return documents related to the portion of the temporal document of interest to a user may now be described.

The formula used for identifying documents which relate to the portion of the temporal document in which the user has expressed an interest is:

$$S_D = \sum_{\text{terms } T} W(t) * TF_{TD} * IDF_T,$$

The terms in the formula are as defined above.

This formula among others takes advantage of the fact that a "rare" term is a more powerful predictor of document utility than a common term, by giving greater weight in ranking documents to those that occur relatively less often in the collection. For example, if a user has indicated interest in a portion of a temporal document which includes the phrase "osteoporosis in women", the term "osteoporosis" alone, if it occurs in the document collection in fewer documents than the term "women," may be of more utility as a filter than the term "women." However, it may also be true that, among documents which refer to osteoporosis, those that also mention women are more likely to be useful than those that do not. Hence, the formula does not exclude the common term from the search process entirely.

It is possible to reduce the time taken to apply the search query generated to identify N documents related to the portion of the temporal document in which the user has expressed an interest, by using compressed document surrogates.

Figure 10:
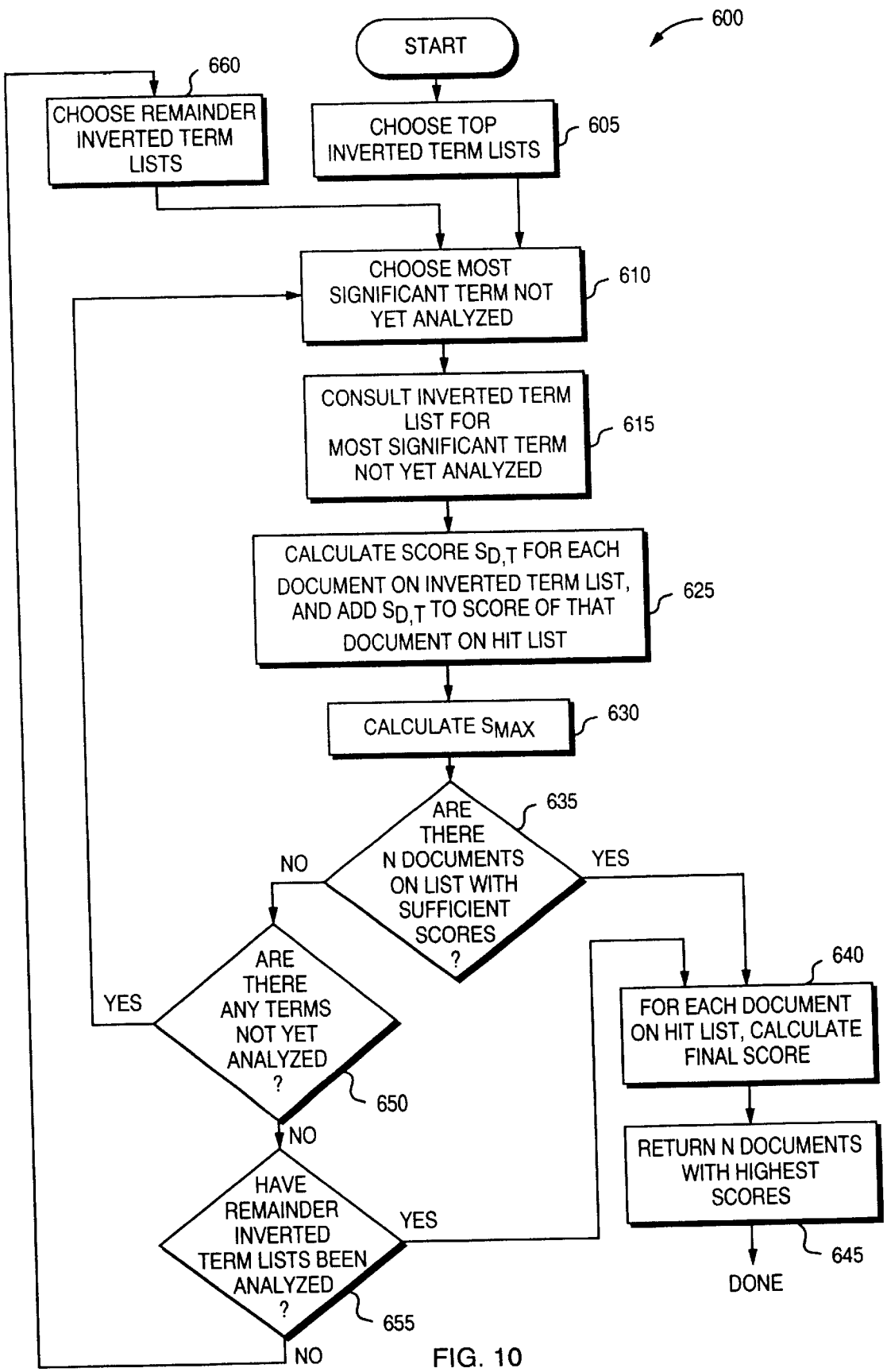
FIG. 10 is a flow chart which illustrates a process by which a search query may be carried out to identify material relating to a portion of a temporal document in which a user has expressed an interest, using compressed document surrogates according to the present invention.

Referring to FIG. 10, shown is a flowchart of an embodiment of a method for using compressed document surrogates to apply a search query to identify documents related to the portion of the temporal document. A process 600 begins with a step 605 wherein it is determined to begin using top inverted term lists for the terms in the query.

According to FIG. 10, the process 600 iterates until a sufficient number of candidate documents for inclusion in the final ranking of N documents is generated.

The iterative portion of the process 600 begins at a step 610 by choosing, from among those terms which are in the query, the most significant term whose top inverted term list has not yet been analyzed. Terms may be ranked in order of significance using any one of a number of measures which will be known to those of ordinary skill in the art. In the preferred embodiment discussed here, the ranking is done by using the quantity $W(t)*IDF_T$, where $W(t)$ is the weighting function for the term T which occurs at time t, and $IDF_T$ is the inverted document frequency for term T:

$$IDF_T = \log((N+K_3)/N_T)/\log(N+K_4)$$

where:
- N is the number of documents in the collection,
- $N_T$ is the document frequency of the term T in the collection, which is the number of documents containing the term T in the collection,
- $K_3$ and $K_4$ are constants. ($K_3$ typically may be assigned a value of 0.5, and $K_4$ 1.0, but these values may be varied without departing from the spirit and scope of the invention.)

This particular formula is by no means the only formula that may be used to select the order in which terms are analyzed. Other formulae will be apparent to one of ordinary skill in the art.

At a step 615, a top inverted term list for that most significant not-yet-analyzed term is examined. In the embodiment illustrated herein, the top list contains one thousand documents, but the number of documents may vary according to a variety of functional factors familiar to one of ordinary skill in the art, such as the total number of documents of potential interest.

The process 600 then continues at a step 625 by calculating, for each document D on the top inverted term list for the term T, the score $S_{TD}$ resulting from its containing the term, where:

$$S_{TD} = W(t) * TF_{TD} * IDF_T,$$

where $W(t)$, $IDF_T$ and $TF_{TD}$, Robertson's term frequency for Term T, are as set forth above.

If a document D for which a score $S_{D,T}$ has been calculated has not previously been found on an inverted term list in the process 600, the document is added to a list L of candidate documents. If the document has been found on an inverted term list previously in the process 600, the document's prior score is adjusted by adding $S_{D,T}$ to the prior score.

After this is done, the process 600 continues at a step 630 by calculating the maximum number of points that could be scored by a document not yet found to contain any analyzed term. (That is, a document that contains all of the desired terms not yet analyzed.) That maximum potential score $S_{Max}$ is the sum, over all the desired terms whose hit lists have not yet been analyzed:

$$S_{Max} = \Sigma W(t) * TF_{Max} * IDF_T,$$

where:

$TF_{Max}$
= Robertson's maximum term frequency for Term T
= $MAX(N_{TD}/( N_{TD}+K_1+K_2*(L_D/L_0)))$,
where: $N_{TD}$, $L_D$, $L_0$, and $K_1$ and $K_2$ have the values set forth above, and $W(t)$ and $IDF_T$ have the value set forth above.

At a next step 635, it is determined whether there are already N documents on the list L whose scores exceed $S_{Max}$, the maximum number of points that could be accrued by a document not found on any of the top inverted term lists yet analyzed. If there are N or more such documents, it is unnecessary to look for any further documents by searching the top inverted term lists of the (relatively less significant) terms not yet analyzed, and a next step 640 in the process 600 calculates a final score for all of the already-located documents on the list L, so that their rankings may be adjusted to account for the documents containing the less significant terms, and a final list of the top N documents may be prepared.

At the step 640, in calculating the final scores for the candidate documents on the list L the process 600 may take advantage of that aspect of the system previously discussed which permits the score of a document to be determined by use of its compressed document surrogate. The process then concludes at a step 645 by ranking the documents on the list L according to the scores of the documents, and returning as its result the N documents which have the highest scores, ranked in order of the scores.

If it is determined at the step 635 that there are not N documents already found whose scores exceed the scores that could be achieved by not-yet-located documents, then the process continues at a step 650 to determine if there are any terms in the search query whose top inverted term lists have not yet been analyzed.

If the process 600 determines at the step 650 that not all terms have had their top inverted term lists analyzed, then the process 600 continues by returning to the step 611 to begin analyzing the most significant term not yet analyzed.

If all terms in the search query have had their top inverted term lists analyzed, then the process 600 proceeds to a step 655. When the process 600 reaches the step 655 after processing top inverted term lists, it is concluded that remainder inverted term lists have not yet been analyzed, and the process 600 proceeds to a step 660. (The path the process 600 will follow when the step 655 is reached after the remainder inverted term lists have been analyzed will be discussed below.)

In the process 600 at the step 660 it is concluded that remainder inverted term lists will now be processed, and control passes to the step 610.

At the step 610, the iterative process of considering the most significant term whose inverted term list has not yet been analyzed begins again, this time considering the remainder inverted term lists. The process 600 cycles through the remainder inverted term lists at steps 615, 625 adding documents to the list L, and increasing the scores of the documents already on the list L, as documents are found on the remainder inverted term lists. As before, after each inverted term list is processed at the step 630 a new $S_{Max}$ is determined. In doing this for the remainder term lists, the maximum term frequency scores again may be determined in the preferred embodiment from the lookup table, but they are not the same maximum term frequency scores as were used for the top inverted term lists. Instead, the lookup table maintains a list of maximum term frequency scores for terms, for documents found in the remainder lists for the terms.

At the step 635 it is determined whether further inverted term lists need to be processed, or whether a sufficient number of documents have been found with sufficiently high scores that no further lists need be searched.

If it is concluded that a sufficient number of documents with sufficiently high scores as described above have been located, then from the step 635 control passes to the step 640, and as described above final scores are calculated, and a final list of N documents with the highest scores is returned, ranked in order of score.

However, if the process 600 proceeds to complete the iterations through all of the remainder inverted term lists without generating a sufficient number of documents with sufficiently high scores, then after the step 635 control passes through the step 650, where it is determined that there are no terms left whose remainder inverted term lists have not yet been processed, to the step 655, where it is determined that because the remainder term lists have been processed, control is to pass to the step 640 to begin the final processing. If the step 640 is reached after the remainder inverted term lists have all been processed, the final scores of the documents on the list L are calculated, and control passes to the step 645 to rank the documents that have been located in order, except that the process returns fewer than N documents.

A further aspect relates to resolving the potential capacity problem which may occur when multimedia material such as video is communicated in a digital fashion.

Conventional synchronous multimedia documents (i.e., temporal documents which contain two media types such as video and text) contain all the synchronization information hard-coded in the document. For example, the text that would scroll in conjunction with a certain video frame or set of frames is predetermined and hard-coded into the multimedia document. When the document is transmitted for viewing, the server ensures that the text data is transmitted at the appropriate time with the related video frames, and the network carries both components of the document—video and text—to the user.

This conventional approach to encoding and providing synchronization information requires that the server send all this material to the user. This increases the load on the server and on the network, thus reducing the number of users who may be serviced at a given time. While this is appropriate if the user is taking advantage of the synchronized information, such as the text which would accompany the video, it is unnecessary if the client uses the information in the synchronized document only sparingly or not at all.

One aspect of the system described herein reduces the load on the video server and network by not creating and transmitting the synchronized document to the user from the video server on which the video is stored unless the user requires it. Instead, only the video material is sent to the user.

In this aspect, it is recognized that, although a search query may be run at any time when a temporal multimedia document such as a video is being transmitted and viewed, and although that search query will utilize the close caption text associated with the video, it is not necessary to create a synchronized document containing all of the close caption text. Rather, a table may be created containing the text that is in the closed caption, and the associated times at which the text occurs in the video, that table may be stored, and that table may be utilized to create the query when appropriate.

Another aspect of the system described herein permits the use of the system with "live" material which is supplied to a user immediately as it is occurring, or with material which the user obtains elsewhere on the Internet which has not been previously prepared by the system and placed in a video library to be made available through a video server maintained in connection with the system. In this aspect, no pre-stored table can be used to provide the text which corresponds to the portion of the temporal document in which the user has indicated an interest, because the material is being supplied to the user as it is created or obtained from elsewhere on the Internet.

The user may be permitted to select the "live" material in any one of a number of ways which will be known to one of ordinary skill in the art. In one embodiment, the user may be given a list of "live" documents which are available, and permitted to choose one, by clicking on it or indicating his interest in any one of a number of alternative ways which will be known to one of ordinary skill in the art.. Alternatively, the user may be invited to search by using search engine or search query techniques such as will be familiar to one of ordinary skill in the art. Still other methods to permit the user to choose a document will be known to one of ordinary skill in the art. The user then may view (or listen to) the temporal document chosen through his work station 2 connected to the Internet 5.

In other embodiments, the user may be permitted to obtain material from elsewhere on the Internet which has not been previously prepared by the system and placed in a video library to be made available through a video server maintained in connection with the system. In one of these embodiments, the user may be permitted to employ a search engine which is maintained as part of the system to find and retrieve a document to the system. The search engine employed may be any one of a number of a type which will be familiar to one of ordinary skill in the art. The user then may view (or listen to) the temporal document chosen through his work station 2 connected to the Internet 5.

In this aspect, the text associated with the portion of the temporal document in which interest has been indicated is obtained by the system as the document is accessed by the user. For example, in the embodiment where the temporal document is video, and close caption information is used as the source of the text, as the video is supplied to the user the closed caption text is stored in a buffer.

According to one method of implementation, the buffer size may be fixed, at a size sufficient to permit the storage of as many terms as may occur within the maximum length of time for which information must be retained in order to permit a query to be constructed when interest is indicated by a user. For example, in the embodiment where it is assumed that only terms that occur within the 30 seconds prior to the indication of interest will be included in the search query, the buffer may be made large enough to contain sufficient storage positions to accommodate all terms which may occur in a 30 second interval. In one embodiment, a buffer size of 8 kilobytes is used.

In another embodiment, the buffer size may be varied as necessary so that there is always sufficient space in the buffer to store all of the terms which have occurred within the maximum length of time for which information must be retained in order to permit a query to be constructed when interest is indicated by a user. For example, in the embodiment where it is assumed that only terms that occur within the 30 seconds prior to the indication of interest will be included in the search query, the buffer size may be varied as necessary so that all terms which have occurred within the prior 30 second interval have been retained.

As time progresses, the terms are stored sequentially in the buffer in the order in which they occur temporally, with each also having stored the time at which it occurred. When the last position in the buffer has been filled, the storage then cycles back to the first position in the buffer, and begins again sequentially, overwriting the terms previously stored in each position. This process is continued indefinitely, as long as the video lasts. At any time interest is expressed, it will always be possible to locate all terms required for the query in the buffer, since it takes 30 seconds or longer to make one complete storage cycle through the buffer. The terms of interest are determined by locating the terms whose associated time values are between the time the signal of interest occurred, and a time 30 seconds before that. The producer-consumer method as described in Jeffay, K., "The real-time producer/consumer paradigm: a paradigm for the construction of efficient, predictable real-time systems," Proceedings, 1993 ACM/SIGAPP Symposium on Applied Computing: States of the Art and Practice, pp. 796–804, may be used to prevent the storage of new information in a portion of the buffer whose content may be required for the generation of a query.

In another embodiment, the temporal document may be obtained from another source on the Web. In this embodiment, the user may be permitted to employ a search engine on his work station 2 connected to the Internet 5 to retrieve and view (or listen to) the temporal document chosen. The search engine employed may be any one of a number of a type which will be familiar to one of ordinary skill in the art. The user then may view (or listen to) the temporal document chosen through his work station 2 connected to the Internet 5. In this embodiment, a plug-in program on the user's workstation 2 may determine the location on the Internet 5 from which the material has been obtained, and may transmit that information through the Internet 5 to the QSE server so that the system may access the material. In this embodiment, the time t at which the indication of interest is given is transmitted from the plug-in program to the QSE server and the QSE server then may determine the weighting function W(t) and extract the relevant text for the search query, so that the material of interest to the user may be determined by the IR server.

In another embodiment, the plug-in program may not transmit the location on the Internet 5 from which the material has been obtained, but instead may determine the portion of the text which is to form the search query and the weighting function W(t) itself using the system and may transmit the weighted search query to the IR server so that the IR server may determine the material of interest to the user.

The techniques described herein have been described as applied to a temporal document that is supplied to a user from a server. It will be apparent to one of ordinary skill in the art, however, that the same method of analysis of text and use of information retrieval (IR) techniques to identify related material that is applied to such dynamic material can also be applied in other contexts. For example, if a user's own movement over time within and between programs and other material is treated as if it were itself a temporally-sequenced "program," context-sensitive help could be provided to a user who sought help, by analysis of the text which the user had visited over a prior predetermined sequence of time.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for finding documents which relate to a portion of a temporal document, comprising:

(a) in response to a signal of interest at a particular time during the temporal document, identifying a portion of the temporal document for which related documents are to be found;

(b) selecting text associated with the portion of the temporal document identified, by reference to a buffer wherein is stored each term in text associated with the temporal document, together with a time in the temporal document at which the term occurs;

(c) weighting each term in the text selected by a function W(t) according to the time t at which the text occurs relative to the time at which the signal of interest occurs;

(d) finding the related documents by use of information retrieval techniques as applied to the text selected;

wherein each term in the text associated with the temporal document is determined as that portion of the document is accessed, and is stored in a buffer together with the time in the temporal document at which the term occurs; and wherein $$W(t) = W_{t_1, t_2}(t) = \int_{k=0}^{t} (1 - \exp(-t_1)) * \exp(-t_1 k) * (1 - \exp(-t_2)) * \exp(-t_2(t-k)),$$

where $t_1$ and $t_2$ are constants.

2. The method of claim 1, wherein $t_1 = 0.0001$ and $t_2 = 0.00025$.

3. The method of claim 2, wherein $W(t) = W_{t_1, t_2}(t)$ for times from 30 seconds before the signal of interest is given until the signal is given, and $W(t) = 0$ for all other times.

4. The method of claim 1, wherein the related documents are accessed through the Internet.

5. The method of claim 4, further including selecting the related documents from among a collection of documents which may be accessed through the Internet, by utilizing databases comprising information about the collection.

6. The method of claim 5, wherein the related documents are selected from the collection according to the scores achieved when evaluating the documents in the collection according to a formula giving scores to documents depending upon the occurrence in the documents of terms which occur in text associated with the portion of the temporal document identified, where each term is weighted by a function W(t) according to the time t at which the term occurs relative to the time at which the signal of interest occurs.

7. The method of claim 6, wherein the terms which occur in the text which is associated with the portion of the temporal document identified, and the times at which the terms occur, are determined by reference to the buffer which contains the terms and the times in the video or audio material at which the terms occur.

8. The method of claim 6, where a predetermined number of documents, 1000, is selected.

9. A method for finding documents which relate to a portion of a temporal document, comprising:

(a) in response to a signal of interest at a particular time during the temporal document, identifying a portion of the temporal document for which related documents are to be found;

(b) selecting text associated with the portion of the temporal document identified, by reference to a buffer wherein is stored each term in text associated with the temporal document, together with a time in the temporal document at which the term occurs;

(c) weighting each term in the text selected by a function W(t) according to the time t at which the text occurs relative to the time at which the signal of interest occurs;

(d) finding the related documents by use of information retrieval techniques as applied to the text selected; and (e) selecting the related documents from among a collection of documents which may be accessed through the Internet, by utilizing databases comprising information about the collection;

wherein each term in the text associated with the temporal document is determined as that portion of the document is accessed, and is stored in a buffer together with the time in the temporal document at which the term occurs;

wherein the related documents are selected from the collection according to the scores achieved when evaluating documents in the collection according to a formula giving scores to documents depending upon the occurrence in the documents of terms which occur in text associated with the portion of the temporal document identified, where each term is weighted by a function W(t) according to the time t at which the term occurs relative to the time at which the signal of interest occurs; and wherein a score $S_D$ of a document D in the collection may be determined by crediting the document D, for each term T in the temporal portion of the document identified which occurs in the document D, with an amount proportional to W(t), to Robertson's term frequency $TF_{TD}$ and to $ID_{FT}$ where W(t) is the weight assigned to a term which occurs at time t relative to the signal of interest, $$TF_{TD}=N_{TD}/(N_{TD}+K_1+K_2*(L_D/L_0)),$$

and $N_{TD}$ is the number of times the term T occurs in document D,
$L_D$ is the length of document D,
$L_0$ is the average length of a document in the collection of documents indexed,
$K_1$ and $K_2$ are constants, and $$ID_{FT}=\log((N+K_3)/N_T)/\log(N+K_4),$$

and

N is the number of documents in the collection,
$N_T$ is the number of documents containing the term T in the collection, and
$K_3$ and $K_4$ are constants.

10. The method of claim 9, wherein $K_1$ is 0.5, $K_2$ is 1.5, $K_3$ is 0.5, and $K_4$ is 1.0.

11. The method of claim 6, wherein the determination of the documents in the collection which receive the highest scores is carried out using compressed document surrogates.

12. The method of claim 6, wherein the determination of the documents in the collection which receive the highest scores is carried out by a server which is distinct from the server which receives the signal of interest.

13. A device for finding documents which relate to a portion of a temporal document, comprising:
  (a) means for identifying a portion of the temporal document for which related documents are to be found, in response to a signal of interest at a particular time during the temporal document;
  (b) means for selecting text associated with the portion of the temporal document identified, by reference to a buffer wherein is stored each term in text associated with the temporal document, together with a time in the temporal document at which the term occurs;
  (c) means for weighting each term in the text selected by a function W(t) according to the time t at which the text occurs relative to the time at which the signal of interest occurs;
  (d) means for finding the related documents by use of information retrieval techniques as applied to the text selected;
  wherein each term in the text associated with the temporal document is determined as that portion of the document is accessed, and is stored in a buffer together with the time in the temporal document at which the term occurs;
  wherein $$W(t) = W_{t_1, t_2}(t) = \int_{k=0}^{t} (1-\exp(-t_1))*\exp(-t_1 k)*(1-\exp(-t_2))*\exp(-t_2(t-k)),$$

where $t_1$ and $t_2$ are constants.

14. The device of claim 13, wherein $t_1=0.0001$ and $t_2=0.00025$.

15. The device of claim 14, wherein $W(t)=W_{t1, t2}(t)$ for times from 30 seconds before the signal of interest is given until the signal is given, and $W(t)=0$ for all other times.

16. The device of claim 13, wherein the related documents are accessed through the Internet.

17. The device of claim 16, further including means for selecting the related documents from among a collection of documents which may be accessed through the Internet, by utilizing databases comprising information about the collection.

18. The device of claim 17, wherein th e related documents are selected from the collection according to the scores achieved when evaluating the documents in the collection according to a formula giving scores to documents depending upon the occurrence in the documents of terms which occur in text associated with the portion of the temporal document identified, where each term is weighted by a function W(t) according to the time t at which the term occurs relative to the time at which the signal of interest occurs.

19. The device of claim 18, wherein the terms which occur in the text which is associated with the portion of the temporal document identified, and the times at which the terms occur, are determined by reference to the buffer which contains the terms and the times in the video or audio material at which the terms occur.

20. The device of claim 18, where a predetermined number of documents, 1000, is selected.

21. A device for finding documents which relate to a portion of a temporal document, comprising:
  (a) means for identifying a portion of the temporal document for which related documents are to be found, in response to a signal of interest at a particular time during the temporal document;
  (b) means for selecting text associated with the portion of the temporal document identified, by reference to a buffer wherein is stored each term in text associated with the temporal document, together with a time in the temporal document at which the term occurs;
  (c) means for weighting each term in the text selected by a function W(t) according to the time t at which the text occurs relative to the time at which the signal of interest occurs;
  (d) means for finding the related documents by use of information retrieval techniques as applied to the text selected;
  (e) means for selecting the related documents from among a collection of documents which may be accessed through the Internet, by utilizing databases comprising information about the collection;
  wherein each term in the text associated with the temporal document is determined as that portion of the document is accessed, and is stored in a buffer together with the time in the temporal document at which the term occurs;
  wherein the related documents are selected from the collection according to the scores achieved when evaluating documents in the collection according to a formula giving scores to documents depending upon the occurrence in the documents of terms which occur in text associated with the portion of the temporal document identified, where each term is weighted by a function W(t) according to the time t at which the term occurs relative to the time at which the signal of interest occurs; and
  wherein a score $S_D$ of a document D in the collection may be determined by crediting the document D, for each term T in the temporal portion of the document iden tified which occurs in the document D, with an amount proportional to W(t), to Robertson's term frequency TFTD and to $ID_{FT}$ where W(t) is the weight assigned to a term which occurs at time t relative to the signal of interest, $$TF_{TD}=N_{TD}/(N_{TD}+K_1+K_2*(L_D/L_0)),$$

and $N_{TD}$ is the number of times the term T occurs in document D, $L_D$ is the length of document D, $L_0$ is the average length of a document in the collection of documents indexed, $K_1$ and $K_2$ are constants, and $$ID_{FT}=\log((N+K_3)/N_T)/\log(N+K_4),$$

and

N is the number of documents in the collection, $N_T$ is the number of documents containing the term T in the collection, and $K_3$ and $K_4$ are constants.

22. The device of claim 21, wherein $K_1$ is 0.5, $K_2$ is 1.5, $K_3$ is 0.5, and $K_4$ is 1.0.

23. The device of claim 18, wherein the determination of the documents in the collection which receive the highest scores is carried out using compressed document surrogates.

24. The device of claim 18, wherein the determination of the documents in the collection which receive the highest scores is carried out by a server which is distinct from the server which receives the signal of interest.

* * * * *